United States Patent
Leblanc

(10) Patent No.: US 11,199,648 B2
(45) Date of Patent: Dec. 14, 2021

(54) METHOD AND SYSTEM FOR REFINING WEATHER FORECASTS USING POINT OBSERVATIONS

(71) Applicant: SKY MOTION RESEARCH, ULC, Montreal (CA)

(72) Inventor: André Leblanc, Mont-Royal (CA)

(73) Assignee: Sky Motion Research, ULC, Montreal (CA)

( * ) Notice: Subject to any disclaimer, the term of this patent is extended or adjusted under 35 U.S.C. 154(b) by 0 days.

(21) Appl. No.: 16/658,636

(22) Filed: Oct. 21, 2019

(65) Prior Publication Data
US 2020/0049855 A1    Feb. 13, 2020

Related U.S. Application Data

(63) Continuation of application No. 14/244,516, filed on Apr. 3, 2014, now Pat. No. 10,495,785.

(60) Provisional application No. 61/835,626, filed on Jun. 16, 2013.

(51) Int. Cl.
   *G01W 1/10*    (2006.01)
(52) U.S. Cl.
   CPC ..................... *G01W 1/10* (2013.01)
(58) Field of Classification Search
   CPC .......................................................... G01W 1/10
   See application file for complete search history.

(56) References Cited

U.S. PATENT DOCUMENTS

| | | | |
|---|---|---|---|
| 5,406,481 A | 4/1995 | Shinozawa et al. |
| 5,574,647 A | 11/1996 | Liden |
| 5,974,360 A | 10/1999 | Otsuka et al. |
| 6,128,578 A | 10/2000 | Sakaino et al. |
| 6,201,494 B1 | 3/2001 | Kronfield et al. |
| 6,298,307 B1 | 10/2001 | Murphy et al. |
| 6,317,686 B1 | 11/2001 | Ran |

(Continued)

FOREIGN PATENT DOCUMENTS

| CA | 2514868 | 8/2004 |
|---|---|---|
| CN | 1481512 A | 3/2004 |

(Continued)

OTHER PUBLICATIONS

Appeal; US court of Appeals for the Federal Circuit; *Electric Power Group LLC v. Alstom S.A.*, Aug. 1, 2016; 12 pages.

(Continued)

*Primary Examiner* — Manuel A Rivera Vargas
(74) *Attorney, Agent, or Firm* — Perkins Coie LLP

(57) ABSTRACT

Provided are methods, devices and non-transitory computer readable storage mediums to generate a more accurate weather forecast by utilizing actual observation of a weather event in a particular location and time. For example, the observation data may be received from a user device and contain information indicative of a weather event that the user observed. Alternatively, or additionally, the observation data may be automatically generated by one or more sensors placed in certain locations and transmitted to a central server automatically upon detecting an observation. The observation data may be used to predict a weather forecast of a location that corresponds to, or is otherwise related to the particular location in which the observed event occurred.

21 Claims, 10 Drawing Sheets

(56) References Cited

U.S. PATENT DOCUMENTS

| | | |
|---|---|---|
| 6,360,172 B1 | 3/2002 | Burfeind |
| 6,496,780 B1 | 12/2002 | Harris et al. |
| 6,501,392 B2 | 12/2002 | Gremmert et al. |
| 6,535,718 B2 | 3/2003 | Krishnamurti |
| 6,535,817 B1 | 3/2003 | Krishnamurti |
| 6,542,825 B2 | 4/2003 | Jones et al. |
| 6,581,009 B1 | 6/2003 | Smith |
| 6,590,529 B2 | 7/2003 | Schwoegler |
| 6,850,184 B1 | 2/2005 | Desrochers et al. |
| 6,920,233 B2 | 7/2005 | Wolfson et al. |
| 6,961,061 B1 | 11/2005 | Johnson et al. |
| 6,980,908 B2 | 12/2005 | McKewon et al. |
| 6,985,837 B2 | 1/2006 | Moon et al. |
| 7,043,368 B1 | 5/2006 | Cote et al. |
| 7,062,066 B2 | 6/2006 | Wolfson et al. |
| 7,069,258 B1 | 6/2006 | Bothwell |
| 7,082,382 B1 | 7/2006 | Rose |
| 7,181,345 B2 | 2/2007 | Rosenfeld et al. |
| 7,231,300 B1 | 6/2007 | Rose, Jr. |
| 7,231,309 B2 | 6/2007 | Yeh et al. |
| 7,321,827 B1 | 1/2008 | Myers et al. |
| 7,379,817 B1 | 5/2008 | Tyson |
| 7,391,358 B2 | 6/2008 | Dupree et al. |
| 7,421,344 B1 | 9/2008 | Marsh et al. |
| 7,472,021 B2 | 12/2008 | Bieringer et al. |
| 7,486,220 B1 | 2/2009 | Kronfield et al. |
| 7,515,088 B1 | 4/2009 | Woodell |
| 7,542,852 B1 | 6/2009 | Rose et al. |
| 7,558,674 B1 | 7/2009 | Neilley |
| 8,280,633 B1 | 10/2012 | Eldering et al. |
| 8,332,084 B1 | 12/2012 | Bailey et al. |
| 2001/0030624 A1 | 10/2001 | Schwoeqler |
| 2001/0049584 A1 | 12/2001 | Jones et al. |
| 2002/0038353 A1 | 3/2002 | Yamamoto |
| 2002/0114517 A1 | 8/2002 | Wolfson |
| 2003/0035860 A1 | 2/2003 | Ando et al. |
| 2003/0193411 A1 | 10/2003 | Price |
| 2004/0010372 A1 | 1/2004 | Schwoeqler |
| 2004/0043760 A1 | 3/2004 | Rosenfeld et al. |
| 2004/0143396 A1 | 7/2004 | Allen et al. |
| 2004/0215483 A1* | 10/2004 | Fixman .......... G06Q 30/02 |
| | | 702/3 |
| 2005/0197774 A1 | 9/2005 | Egi |
| 2005/0222770 A1 | 10/2005 | McKewon et al. |
| 2006/0015254 A1 | 1/2006 | Smith |
| 2006/0271297 A1 | 11/2006 | Repelli et al. |
| 2006/0287818 A1 | 12/2006 | Okude et al. |
| 2007/0069941 A1 | 3/2007 | Pearlman et al. |
| 2007/0078977 A1* | 4/2007 | Kaplan ............ G06Q 10/04 |
| | | 709/224 |
| 2007/0112476 A1 | 5/2007 | Obradovich |
| 2007/0256716 A1 | 11/2007 | Resner et al. |
| 2008/0097701 A1 | 4/2008 | Zawadzki et al. |
| 2008/0201647 A1 | 8/2008 | Lagerstedt et al. |
| 2008/0313037 A1 | 12/2008 | Root et al. |
| 2009/0037100 A1 | 2/2009 | Fujiwara et al. |
| 2009/0088965 A1 | 4/2009 | Burckart et al. |
| 2009/0157294 A1 | 6/2009 | Geelen |
| 2009/0157298 A1 | 6/2009 | Kon et al. |
| 2009/0210353 A1 | 8/2009 | Mitchell et al. |
| 2010/0250581 A1* | 9/2010 | Chau ............ G06F 16/58 |
| | | 707/769 |
| 2011/0054776 A1 | 3/2011 | Petrov et al. |
| 2011/0267224 A1 | 11/2011 | Venkatachalam et al. |
| 2011/0307168 A1 | 12/2011 | Kieff |
| 2012/0147030 A1 | 6/2012 | Hankers et al. |
| 2012/0170030 A1 | 7/2012 | Mihajlovic et al. |
| 2013/0013206 A1 | 1/2013 | Guha et al. |
| 2013/0035860 A1 | 2/2013 | Guha et al. |
| 2013/0046459 A1 | 2/2013 | Itakura |
| 2014/0067270 A1 | 3/2014 | Gail et al. |
| 2014/0303893 A1 | 10/2014 | LeBlanc |
| 2014/0368361 A1 | 12/2014 | LeBlanc |
| 2014/0372038 A1 | 12/2014 | LeBlanc |
| 2014/0372039 A1 | 12/2014 | LeBlanc |
| 2014/0379264 A1 | 12/2014 | LeBlanc |
| 2015/0006079 A1 | 1/2015 | LeBlanc |

FOREIGN PATENT DOCUMENTS

| | | |
|---|---|---|
| CN | 101379767 A | 1/2009 |
| CN | 102809767 A | 12/2012 |
| CN | 102169194 A | 8/2014 |
| EP | 1218698 A1 | 7/2002 |
| EP | 1566665 A1 | 8/2005 |
| EP | 2415044 A1 | 2/2012 |
| JP | H05-307080 A | 11/1993 |
| JP | H08-261854 A | 10/1996 |
| JP | H09-096679 A | 4/1997 |
| JP | H11-2539 A | 1/1999 |
| JP | H11-014760 A | 5/1999 |
| JP | H11-136365 A | 5/1999 |
| JP | H11-242080 A | 9/1999 |
| JP | 2000193469 A | 7/2000 |
| JP | 2001081711 A | 3/2001 |
| JP | 2002099576 A | 4/2002 |
| JP | 2002148061 A | 5/2002 |
| JP | 2000258174 A | 9/2002 |
| JP | 2002357670 A | 12/2002 |
| JP | 2003030421 A | 1/2003 |
| JP | 2003121172 A | 4/2003 |
| JP | 2003216752 A | 7/2003 |
| JP | 2003300176 A | 10/2003 |
| JP | 2004028625 A | 1/2004 |
| JP | 2004069478 A | 3/2004 |
| JP | 2004170201 A | 6/2004 |
| JP | 2004516462 A | 6/2004 |
| JP | 2004184224 A | 7/2004 |
| JP | 2005300176 A | 10/2005 |
| JP | 2005316886 A | 11/2005 |
| JP | 2006197106 A | 7/2006 |
| JP | 2006337182 A | 12/2006 |
| JP | 2007047034 A | 2/2007 |
| JP | 2007163442 A | 6/2007 |
| JP | 2008008776 A | 1/2008 |
| JP | 2008157919 A | 7/2008 |
| JP | 2008203173 A | 9/2008 |
| JP | 2009025083 A | 2/2009 |
| JP | 2009108456 A | 5/2009 |
| JP | 2009230720 A | 10/2009 |
| JP | 2010060444 A | 3/2010 |
| JP | 2010521020 A | 6/2010 |
| JP | 2010164557 A | 7/2010 |
| JP | 2011257149 A | 12/2011 |
| JP | 2012052930 A | 3/2012 |
| JP | 2012126384 A | 7/2012 |
| JP | 05307080 B2 | 10/2013 |
| TW | 200506410 A | 2/2005 |
| TW | 201209441 A | 3/2012 |
| TW | 201224502 A | 6/2012 |
| TW | 201231920 A | 8/2012 |
| WO | 0125727 A1 | 4/2001 |
| WO | 0223462 A1 | 3/2002 |
| WO | 0249310 A2 | 6/2002 |
| WO | 2012062760 A2 | 5/2012 |
| WO | 2012089280 A1 | 7/2012 |
| WO | 20140161077 A1 | 10/2014 |
| WO | 20140161079 A1 | 10/2014 |

OTHER PUBLICATIONS

C. F. Mass "IFPS and the Future of the National Weather Servicer", Forcaster's Forum, American Meteorological Society. Feb. 2003. Nov. 11, 2002 and Dec. 2, 2002, pp. 75-79.

EP Search Report of Application No. 14778718.8, dated Nov. 25, 2016.

EP Search Report of Application No. 14778742.8, dated Dec. 23, 2016.

EP Search Report of Application No. 14779094.3, dated Dec. 8, 2016.

EP Search Report of Application No. 14779873.0, dated Nov. 23, 2016.

(56) References Cited

OTHER PUBLICATIONS

International Search Report and Written Opinion dated Jul. 11, 2014, directed to International Application No. PCT/CA2014/000317; 12 pages.
International Search Report and Written Opinion dated Jul. 15, 2014, directed to International Application No. PCT/CA2014/000314; 8 pages.
International Search Report and Written Opinion dated Jul. 17, 2014, directed to International Application No. PCT/CA20014/000315; 8 pages.
International Search Report and Written Opinion dated Jul. 21, 2014, directed to International Application No. PCT/CA2014/000333; 10 pages.
International Search Report and Written Opinion dated Jul. 23, 2014, directed to International Application No. PCT/CA2014/000313; 9 pages.
International Search Report and Written Opinion dated Jul. 24, 2014, directed to International Application No. PCT/CA2014/000330; 10 pages.
LeBlanc, U.S. Advisory Action dated Nov. 25, 2015, directed to U.S. Appl. No. 13/922,800; 4 pages.
LeBlanc, U.S. Office Action dated Jan. 7, 2015, directed to U.S. Appl. No. 13/922,800; 16 pages.
LeBlanc, Office Action dated Aug. 7, 2015, directed to U.S. Appl. No. 13/922,800; 19 pages.
LeBlanc, U.S. Appl. No. 13/856,923, filed Apr. 4, 2013, 39 pages.
LeBlanc, U.S. Appl. No. 13/922,800, filed Jun. 20, 2013, 34 pages.
LeBlanc, U.S. Appl. No. 13/947,331, filed Jul. 22, 2013, 35 pages.
LeBlanc, U.S. Appl. No. 14/244,383, filed Apr. 3, 2014, 39 pages.
LeBlanc, U.S. Appl. No. 14/244,586, filed Apr. 3, 2014, 40 pages.
Precipitation probability—Wikipedia, https://ja.wikipedia.org/wiki/%E9%99%8D%E6%B0%B4%E7%A2%BA%E7%68E%87, dated Jun. 22, 2017.
Press release. (Oct. 26, 2012) "New AccuWeather App for Windows 8 Takes Users on a Journey," located at <http://www.accuweather.com/en/press/699373> visited on May 26, 2014. (3 pages).
Probability of Precipitation, Feb. 23, 2012, URL <http://web.archive.org/web/20120223192309/https:/ja.wikipedia.org/wiki%E9%99%8dE6%B0%B4%E7%A2%BAE7%8E%87>.
Qhtani, A., (Feb. 25, 2012) "WeatherSpark," located at <https://www.youtube.com/watch?v=6LZjaweaXyc> visited on Jun. 18, 2014. (1 page).
Shen J., "Significance, Current Situation and Method of Weather Probablity Forecast," Hubei Weather, No. 2, 1996.
Wikipedia.org. (Mar. 12, 2013) "Weather forecasting," located at <https://web.archive.org/web/20130312014022/http://en.wikipedia.org/wiki/Weather_forecasting>. (15 pages).

\* cited by examiner

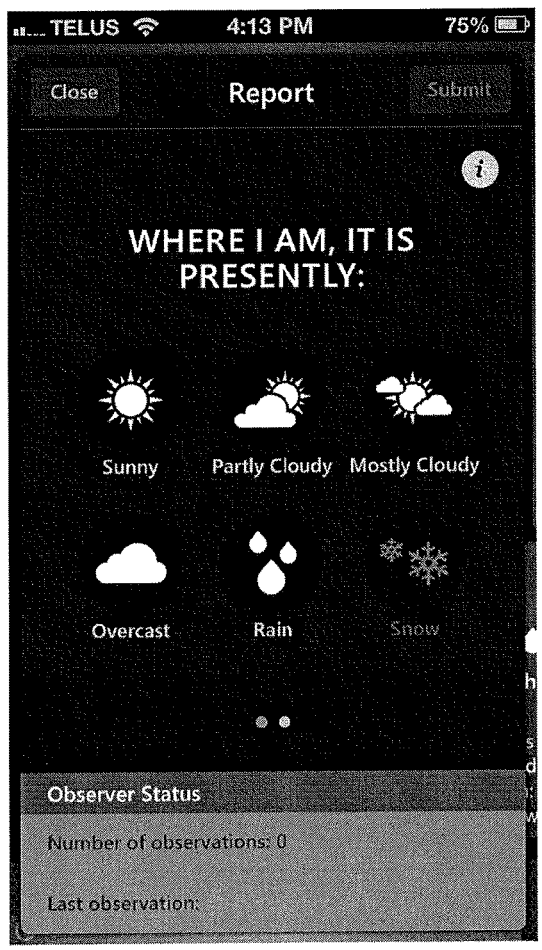
FIGURE 5C
FIGURE 5D

METHOD AND SYSTEM FOR REFINING WEATHER FORECASTS USING POINT OBSERVATIONS

CROSS-REFERENCE TO RELATED APPLICATIONS

This application is a continuation of U.S. patent application Ser. No. 14/244,516, filed on Apr. 3, 2014, which claims the benefit of priority to U.S. Provisional Application No. 61/835,626, filed on Jun. 16, 2013, and is related to co-owned and co-invented U.S. patent application Ser. No. 13/856,923, filed on Apr. 4, 2013, U.S. patent application Ser. No. 13/922,800 (now U.S. Pat. No. 10,203,219), filed on Jun. 20, 2013 (issued on Feb. 12, 2019), U.S. patent application Ser. No. 13/947,331, filed on Jul. 22, 2013, U.S. Provisional Application No. 61/836,713, filed on Jun. 19, 2013, and U.S. Provisional Application No. 61/839,675, filed on Jun. 26, 2013, the entire contents of which are hereby incorporated by reference.

FIELD OF THE INVENTION

The subject matter disclosed generally relates to methods for producing weather forecasts. More specifically, the subject matter relates to software applications for producing weather forecasts.

BACKGROUND OF THE INVENTION

Presently available systems for producing weather forecasts are push systems only; that is, the system gathers information from sensors, databases, etc., produces a weather forecast based on this information and pushes the weather forecast to users.

Users often find that the forecast is not accurate for their location and the producer of the forecast has no way to determine if their forecasts are really accurate.

There is a need in the market for pulling information from observers, who may also be users, located on the territory for which weather forecasts are produced to help increase the accuracy of the weather forecasts.

SUMMARY

There may be provided a computer-implemented method comprising: receiving, from a remote device, weather-related observation data associated with a first location and a first time, the weather-related observation data comprising data obtained from observing a weather-related event associated with the first location and the first time, generating a weather forecast associated with a second location and a second time based on the weather-related observation data, and outputting the weather forecast to the remote device.

In some embodiments, the method may comprise forming an image of the second location, the image comprising pixels associated with weather forecast values.

In some embodiments, the method may comprise forming at least two images of the second location, each of the images being associated with a different time.

In some embodiments, the weather-related event may comprise at least one of hail, wind, lightening, temperature, precipitation and intensity of sunlight.

In some embodiments, the method may comprise modifying a weather forecast value associated with a pixel based on the weather-related observation data.

In some embodiments, the weather-related event may be observed by a user operating the remote device, and the user causes the remote device to transmit the weather-related observation data.

In some embodiments, the remote device may automatically transmit weather-related observation data upon detecting an observation of a weather-related event.

In some embodiments, the method may comprise: receiving, from a second remote device, second weather-related observation data associated with a third location and a third time, the second weather-related observation data comprising data obtained from observing a weather-related event associated with the third location and the third time, wherein the weather forecast associated with the second location and the second time is generated based on both the weather-related observation data associated with the first location and the first time and the second weather-related observation data associated with the third location and the third time.

In some embodiments, the method may comprise: storing the received weather-related observation data, producing a statistic about the stored weather-related observation data, the statistic comprising information indicative of a number of remote devices that have received the weather forecast, and outputting at least part of the statistic to the remote device.

In some embodiments, the method may comprise: comparing the weather-related observation data with pre-stored weather data, and determining, based on the comparison, weight of the weather-related observation data that affects the generating of weather forecast.

In some embodiments, the method may comprise: producing a trust rating associated with the remote device, and determining, based on the trust rating, weight of the weather-related observation data received from the remote device that affects the generating of weather forecast. Additionally or alternatively, a trust rating may be assigned to a user who may be operating, or otherwise associated with, one or more remote devices.

In other embodiments, there may be a method for refining a weather forecast that comprise: obtaining weather-related observations at a particular position and at a given time, and using the weather-related observations in forming a gridded image of a particular area on Earth, the gridded image comprising pixels wherein each pixel has a value which corresponds to a weather value which in turn corresponds to a weather forecast, wherein forming a gridded image comprises forming multiple gridded images, each gridded image corresponds to a moment in time.

Further, there may also be a method for forecasting a presence of weather-related events at a particular position at a given time. In some embodiments, the method may comprise: obtaining a weather-related observation of a weather-related event at the particular position and at the given time, changing or confirming a weather value in a gridded image based on the weather-related observation, and producing a weather forecast using the changed or confirmed weather value.

In other embodiments, there may be a method for using contributions from observers in a weather forecast. The method may comprise: obtaining weather-related observations from the observers, each observation being made at a particular position and at a given time, using the weather-related observations from the observers in the production a future weather forecast for a user, calculating statistics about the weather-related observations from the observers, weather forecasts and users that have benefited from the observations, and sending to at least one of the observers a message comprising at least part of the statistics about the weather-related observations from at least one of the observers.

In some embodiments, there may be a device comprising one or more processors, a memory storing computer instructions that can be executed by the one or more processors such that the device is caused to perform any one or more of the methods described above, when the instructions are executed. Further, there may be a non-transitory computer-readable medium storing such instructions. The device may be a mobile device such as, non-exclusively, a handheld device, a cellphone, a vehicle, etc.

BRIEF DESCRIPTION OF THE DRAWINGS

Further features and advantages of the present disclosure will become apparent from the following detailed description, taken in combination with the appended drawings, in which:

FIGS. 5A to 5D are screenshots showing an example of an application used for presenting a weather forecast and for obtaining point observations from observers according to an embodiment;

It will be noted that, throughout the appended drawings, like features are identified by like reference numerals.

DETAILED DESCRIPTION OF THE INVENTION

Figure 1A:
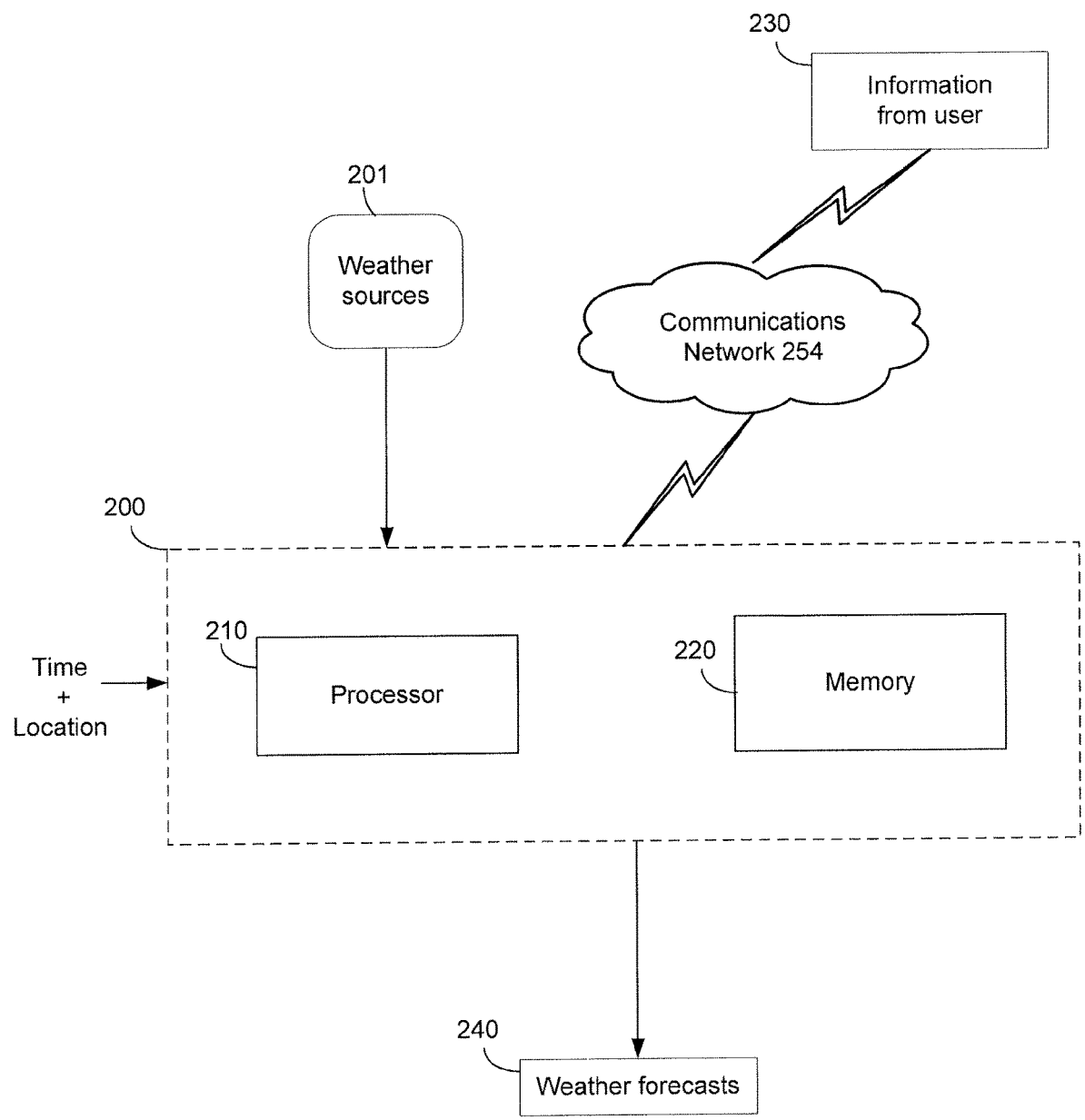
FIG. 1A shows an example of a block diagram of a system for producing weather forecasts using point observations (a nowcaster) according to an embodiment.

The embodiments will now be described more fully hereinafter with reference to the accompanying drawings, which form a part hereof, and which show, by way of illustration, specific embodiments by which the embodiments may be practiced. The embodiments are also described so that the disclosure conveys the scope of the claimed subject matter to those skilled in the art. The embodiments may, however, be embodied in many different forms and should not be construed as limited to the embodiments set forth herein.

Among other things, the present embodiments may be embodied as methods or devices. Accordingly, the embodiments may take the form of an entirely hardware embodiment, an entirely software embodiment, an embodiment combining software and hardware aspects, etc. Furthermore, although the embodiments are described with reference to a portable or handheld device, they may also be implemented on desktops, laptop computers, tablet devices or any computing device having sufficient computing resources to implement the embodiments.

Definitions

In the present specification, the following terms are meant to be defined as indicated below:

Nowcasting: The term nowcasting is a contraction of "now" and "forecasting"; it refers to the sets of techniques devised to make short-term forecasts, typically in the 0 to 12 hour range.

A nowcaster is a weather forecasting device which prepares very short-term (e.g., one minute, five minutes, 15 minutes, 30 minutes, etc.) forecasts for a given territory, which is a very small region on Earth (5 meters, 10 meters, 50 meters, 100 meters, 500 meters, 1,000 meters, etc.).

A weather value is a weather-related quantity or attribute of any sort such as temperature, pressure, visibility, precipitation type and intensity, accumulation, cloud cover, wind, etc.

A forecasted weather value is a weather value that is predicted by the nowcaster.

A weather-related event is, for example, at least one of hail, a wind gust, lightning, a temperature change, etc.

Precipitation type (PType): indicates the type of precipitation. Examples of precipitation types include, but are not limited to, rain, snow, hail, freezing rain, ice pellets, ice crystals, etc.

Precipitation rate (PRate): indicates the precipitation intensity. Examples of precipitation rate values include, but are not limited to, no (i.e., none), light, moderate, heavy, extreme, etc. In an embodiment, the precipitation rate can also be expressed as a range of values such as: none to light, light to moderate, moderate to heavy, or any combination of the above.

Precipitation probability: indicates the probability that precipitation might occur. Examples of precipitation probability values include, but are not limited to, no, unlikely, slight chance of, chance of, likely, very likely, certain, etc.

In an embodiment, the precipitation probability can also be expressed as a range of values such as: none to light, light to moderate, moderate, or to heavy. Precipitation probability may also be expressed in terms of percentages; e.g., 0%, 25%, 50%, 75%, 100%, etc.; or ranges of percentages; e.g., 0% to 25%, 25% to 50%, 50% to 75%, 75% to 100%, etc. In an embodiment, the precipitation probability may be taken from a probability distribution.

Precipitation type and precipitation rate categories (PTypeRate): a PTypeRate category is combination of precipitation type and precipitation rate to which may be associated a probability of occurrence for a given period to indicate the possibility of receiving a certain type of precipitation at a certain rate.

A weather forecast is a set of one or more forecasted weather values that are displayable to users.

A weather-related observation may be an image, a video, a free-form text (tweet, message, email, etc.), a weather value of any sort such as temperature, pressure, visibility, precipitation type and intensity, accumulation, cloud cover, wind, etc.

A point observation is an observation, as defined herein, made at a particular position (sometimes also referred to as a "location") at a given time.

The particular position is the position on Earth at which the observation is made. A precision of five meters to 10 meters is appropriate for the embodiments described herein, but the variation in the position may be greater, such as 25 meters, 50 meters, 100 meters, 1000 meters or more (e.g., less precision). The means for obtaining the particular position include any type of geo-location means or positioning system available at the time of filing this patent application. The geo-location means or positioning system may be automated or not. Automated geo-location means or positioning systems include global positioning systems, RF location systems, radiolocation technologies, Internet Protocol (IP) addresses, MAC addresses, WiFi, Radio Frequency Identification (RFID), etc. The positioning systems may also be manual, such as providing a street address, street corner, building or landmark, etc.

A given time is defined as the hour, minute and second at which the point observation is made in the time zone corresponding to the particular position. The hour, minute and second for the given time can also be recorded according to Coordinated Universal Time (UTC) or Greenwich Mean Time (GMT) such that the given time is independent of the particular position. The precision of the given time may be more or less than one second. For example, in some embodiments, a precision of 5 seconds, 10 seconds, 30 seconds, 60 seconds, etc., may be sufficient for the embodiments described herein.

A user is a person to whom a weather forecast is forwarded. An observer is an entity providing automated and/or manned observations. An observer may be a person or an automated machine. An observer may also be a user as defined herein.

A gridded image is an image which comprises latitude and longitude coordinates. It is therefore a collection of bi-dimensional geo-localized points I pixels.

Each pixel in a gridded image corresponds to a position and can either represent a single weather value, a probability distribution of values or a level of confidence.

Briefly stated, the present embodiments describe a computer implemented method and system for generating more accurate weather forecasts by taking into account not only the various types of weather values but also the actual observations in particular locations at particular times. Such observations can be automated and pushed to a database automatically, or can be user-oriented such as users individually reporting their observations.

Nowcaster

Figure 1B:
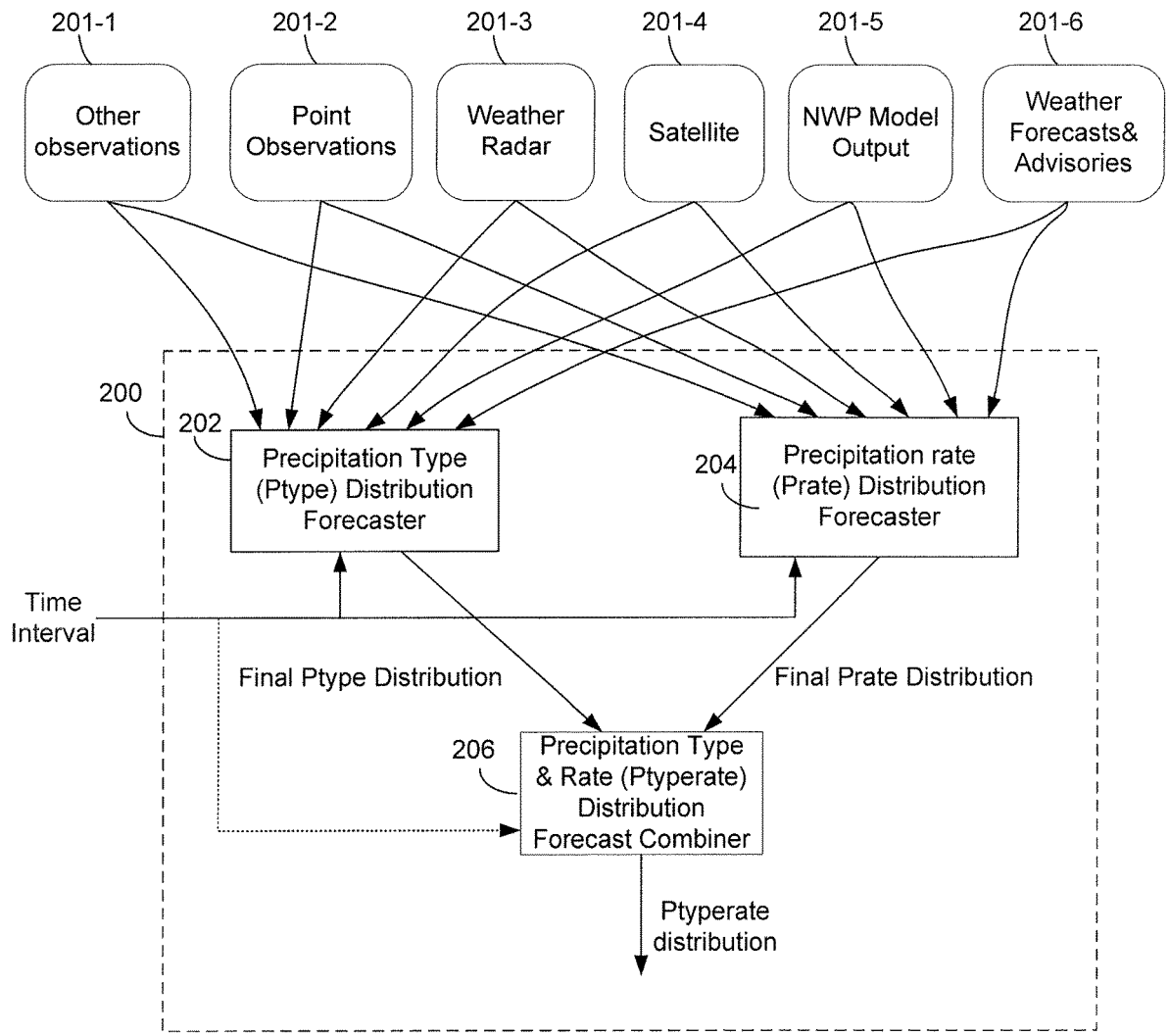
FIG. 1B shows an example of a block diagram of a system for producing weather forecasts using point observations (a nowcaster) according to another embodiment.
Figure 1C:
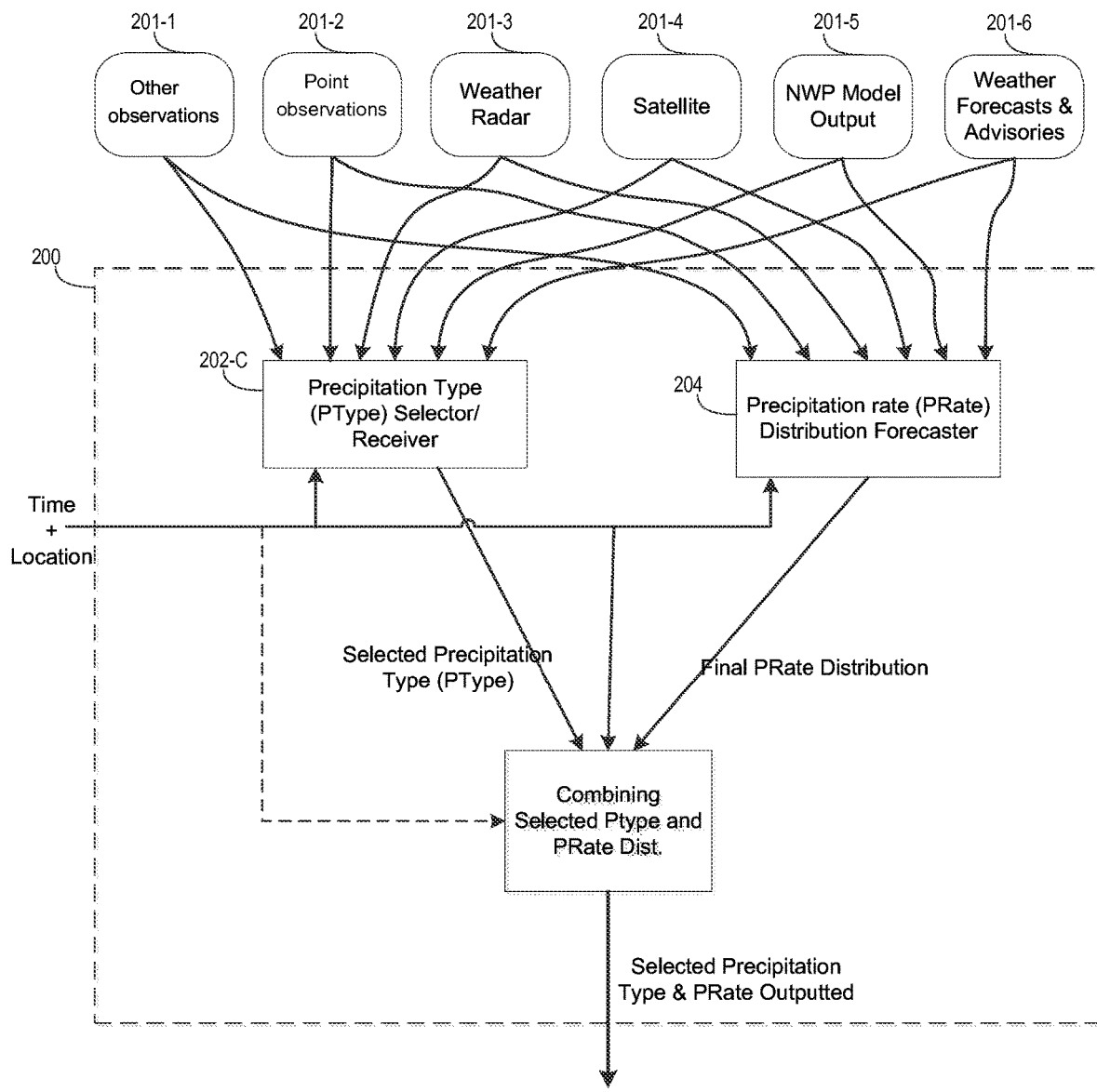
FIG. 1C shows an example of a block diagram of a system for producing weather forecasts using point observations (a nowcaster) according to another embodiment.

FIGS. 1A-1C are examples of block diagrams of a nowcaster according to the present description.

As shown in FIGS. 1A-1C, the nowcaster 200 receives weather observations from different sources 201 such as weather observations sources including but not limited to: point observations 201-2 (e.g. feedback provided by users and automated stations), weather radars 201-3, satellites 201-4 and other types of weather observations 201-1, and weather forecast sources such as numerical weather prediction (NWP) model output 201-5 and weather forecasts and advisories 201-6.

The nowcaster 200 comprises a memory 220 and a processor 210. The memory 220 comprises the instructions for the method and also stores data from the weather sources 201, intermediate results and weather forecasts. The processor 210 allows the nowcaster 200 to perform calculations.

The nowcaster 200 can receive information 230 from a user 150 through a communication network 254. According to an embodiment, this information 230 may be a chosen time increment.

The nowcaster 200 outputs a weather forecast, or a succession of weather forecasts.

FIG. 1B is one embodiment of the nowcaster 200. In this embodiment, the nowcaster 200 comprises a PType distribution forecaster 202 and a PRate distribution forecaster 204. The PType forecaster 202 receives the weather observations from the different sources 201 and outputs a probability distribution of precipitation type over an interval of time, for a given latitude and longitude (and/or location). For example:
  a. Snow: 10%
  b. Rain: 30%
  c. Freezing Rain: 60%
  d. Hail: 0%
  e. Ice Pellets: 0%

Similarly, the PRate forecaster 204 receives the weather observations for a given latitude and longitude from the different sources 201 and outputs a probability distribution forecast of a precipitation rate (PRate) in a representation that expresses the uncertainty. For example, the PRate may be output as a probability distribution of precipitation rates or a range of rates over an interval of time, for a given latitude and longitude. For example:
  f. No Precip.: 30%
  g. Light: 40%
  h. Moderate: 20%
  i. Heavy: 10%

The PRate and PType values output by the PRate forecaster 204 and the PType forecaster 202 are sent to a forecast combiner 206 to combine these values into a single value PTypeRate which represents the precipitation outcomes. For example, if the value of PType is "Snow," and the value of "PRate" is heavy, the combined value of PTypeRate may be "heavy snow."

For a given latitude and longitude, the system outputs forecasted PTypeRate Distributions for predefined time intervals, either fixed (ex: 1 minute) or variable (ex: one minute, then five minutes, then 10 minutes, etc.). The system can either pre-calculate and store forecasted PTypeRate Distributions in a sequence of time intervals, or calculate it in real time. A PTypeRate Distribution represents, for each time interval, the certainty or uncertainty that a PTypeRate will occur.

With reference to FIG. 1B, the forecast combiner 206 receives the final PRate distribution from the PType forecaster 202 and the final PRate distribution from the PRate forecaster 204 to combine them into a group of PTypeRate distribution values, each representing the probability of receiving a certain type of precipitation at a certain rate. An example is provided below.

Assuming that the PType distribution is as follows: Snow: 50%, Rain: 0%, Freezing rain: 30%, Hail: 0%, Ice pellets: 20%, and the PRate distribution is as follows: None: 0%, Light: 10%, Moderate: 20%, Heavy: 30%, Very heavy: 40%, the PTypeRate distributions may be as follows:

TABLE 1

An Example of PTypeRate Distribution Table

| PRate | PType | | | | |
|---|---|---|---|---|---|
| | Snow 50% | Rain 0% | Freez. Rain 30% | Hail 0% | Ice Pellets 20% |
| None 0% | No precipitation | No precipitation | No precipitation | No precipitation | No precipitation |
| Light 10% | 5% light snow | No precipitation | 3% light freezing rain | No precipitation | 2% light ice pellets |
| Moderate 20% | 10% moderate snow | No precipitation | 6% moderate freezing rain | No precipitation | 4% moderate ice pellets |
| Heavy 30% | 15% heavy snow | No precipitation | 9% heavy freezing rain | No precipitation | 6% heavy ice pellets |
| Very Heavy 40% | 20% heavy snow | No precipitation | 12% very heavy freezing rain | No precipitation | 8% very heavy ice pellets |

Accordingly, the forecast combiner 206 multiplies the probability of each type of precipitation by the probability of each rate of precipitation to obtain a probability of receiving a certain type of precipitation at a certain rate for example, 20% chance of heavy snow, or 12% chance of very heavy freezing rain. In an embodiment, it is possible to associate probability ranges with textual information for displaying the textual information to a user instead of the probabilities in numbers. For example, probabilities that are between 5% and 15% may be associated with the text: "low chance," while probabilities that are between 40% and 70% may be associated with the text "high chance," or "very likely," etc. whereby, instead of displaying: "60% chance of heavy snow," it is possible to display: "high chance of heavy snow."

In another embodiment, it is possible to combine two or more different PTypeRates along one or more dimensions (the dimensions including: the rate, type or probability). For example, results of such combination may include: Likely light to moderate rain, Likely light to moderate rain or heavy snow; Likely moderate rain or snow; likely rain or snow; chance of light to moderate rain or heavy snow or light hail; chance of moderate rain, snow or hail; chance of rain, snow or hail, etc.

Accordingly, the nowcaster 200 receives the location for which the nowcasts are needed and the time and/or time interval for which the nowcasts are needed and outputs the PTypeRate distribution for the given location and for the specific time.

FIG. 1C illustrates another embodiment of the nowcaster 200. In this embodiment, the nowcaster 200 comprises a PType selector/receiver 202-C and a PRate distribution forecaster 204.

Similar to the embodiment shown in FIG. 1B, the PRate distribution forecaster 204 receives the weather observations for a given latitude and longitude from the different sources 201 and outputs a probability distribution forecast of a precipitation rate (PRate) in a representation that expresses the uncertainty. For example, the PRate may be output as a probability distribution of precipitation rates or a range of rates over an interval of time, for a given latitude and longitude. For example:
f. No Precip.: 30%
g. Light: 40%
h. Moderate: 20%
i. Heavy: 10%

However, the PType selector/receiver 202-C does not output a probability distribution associated with different types of precipitation. Instead, the PType selector/receiver 202-C receives weather observations for a given latitude and longitude from the different sources 201 to select one precipitation type from a list of different precipitation types. For example, based on the inputs received from the sources 201, the PType selector/receiver 202-C selects a single precipitation type that is most likely to occur in the given latitude and longitude (and/or location) from the following list of precipitation types:
a. Snow
b. Rain
c. Freezing Rain
d. Hail
e. Ice Pellets
f. Mix (e.g., a+c, a+d, b+c, a+e, c+e, d+e, etc.)

From the list of precipitation types such as the one above, only one precipitation type is selected for a given location. For example, a mix of snow and freezing rain can be selected as the most likely precipitation type for a given location at a given time. The precipitation type is not associated with a probability value. In fact, since only one precipitation type is selected for any given location and time corresponding to the location, the selected precipitation type will have the effective probability value of 100%.

The list of precipitation types that are available for selection of one type may include a mix type that represents a mix of two different precipitation types (e.g., snow and freezing rain, hail and ice pellets, etc.). A mix type is considered as a distinct precipitation type available for selection and, as shown above in (f) of the list, there can be many different mix types representing the mix of different pairs of various precipitation types.

In another embodiment, the precipitation type is not selected by the PType selector/receiver 202-C but instead is received from a source outside the nowcaster 200. In other words, the nowcaster 200 may request to a remote source (e.g., a third-party weather service) identification of the precipitation type that is most likely to occur for a given location at a given time and receive a response from the source identifying the most likely precipitation type. In this case, selection of the precipitation type is not performed by the nowcaster 200. The nowcaster 200 merely is inputted with the already-selected precipitation type and thereby can save computational power of the nowcaster 200 that would otherwise have been needed to perform the selection.

The selected precipitation type and the PRate values respectively output by the PType selector/receiver 202-C and the PRate distribution forecaster 204 are combined. For example, if the selected precipitation type is snow, and the PRate values are as described above, the combined information would indicate:

a. No Snow: 30%
b. Light Snow: 40%
c. Moderate Snow: 20%
d. Heavy Snow: 10%.

As only one precipitation type is concerned, only minimal amount of computational power is needed to perform the combining to output the final weather forecast data. Since the PType selector/receiver 202-C will output one (1) precipitation type for a given location and time, if the PRate distribution forecaster 204 outputs a number m of probability distribution, the final weather forecast data will comprise only a number m (m*1) of weather forecast distribution.

In outputting the final weather forecast data, it is possible to associate probability ranges with textual information for displaying the textual information to the user instead of the probabilities in numbers, similar to the embodiment shown in FIG. 1B. For example, probabilities that are between 5% and 15% may be associated with the text: "low chance," while probabilities that are between 40% and 70% may be associated with the text "high chance," or "very likely," etc. whereby, instead of displaying: "60% chance of heavy snow," it is possible to display: "high chance of heavy snow."

Accordingly, the nowcaster 200 receives the location for which the nowcasts are needed and the time and/or time interval for which the nowcasts are needed and outputs the selected PType and PRate distribution for the given location and for the specific time.

The nowcaster according to the embodiment shown in FIG. 1C may be advantageous over the embodiment shown in FIG. 1B in certain circumstances in which efficiency is desired. The embodiment of FIG. 1C can be implemented using much less processing power than the embodiment of FIG. 1B. However, the embodiment of FIG. 1B may be more suitable than the embodiment of FIG. 1C in providing more detailed and accurate snapshot of weather forecast data for any given location and time.

Crowd-Sourcing Weather Observations

Briefly stated, the present embodiments describe a system and/or a method that collects and manages weather-related observations (or referred to as just "observations") from users and/or automated machines to generate observation mosaics (e.g., mosaics) for the purpose of weather forecasting. The system comprises many automated and/or manned observation sources (e.g., the observers) that send geo-tagged observations to a database. A mosaic builder incorporates the observations to form a gridded image (e.g., a mosaic) of a particular area on the globe (e.g., the domain) thus creating a "best-guess" of weather values for each pixel in the domain. The embodiments of the nowcaster illustrated in FIGS. 1A-1C take in user observation data (e.g., 201-2) as inputs to predicting or otherwise identifying the most accurate forecasted precipitation type and precipitation rate distribution for any given location at any given time.

To build a mosaic, the mosaic builder chooses the observations to include based on time-of-observation and position. Each observation is positioned on the Mosaic at precisely the geo-location provided.

A region around the observation is defined (observation region). Each point in an observation region may contribute to the mosaic based on various factors such as distance to observation, time of observation, observer trust and reliability factor, and more factors.

Figure 2:
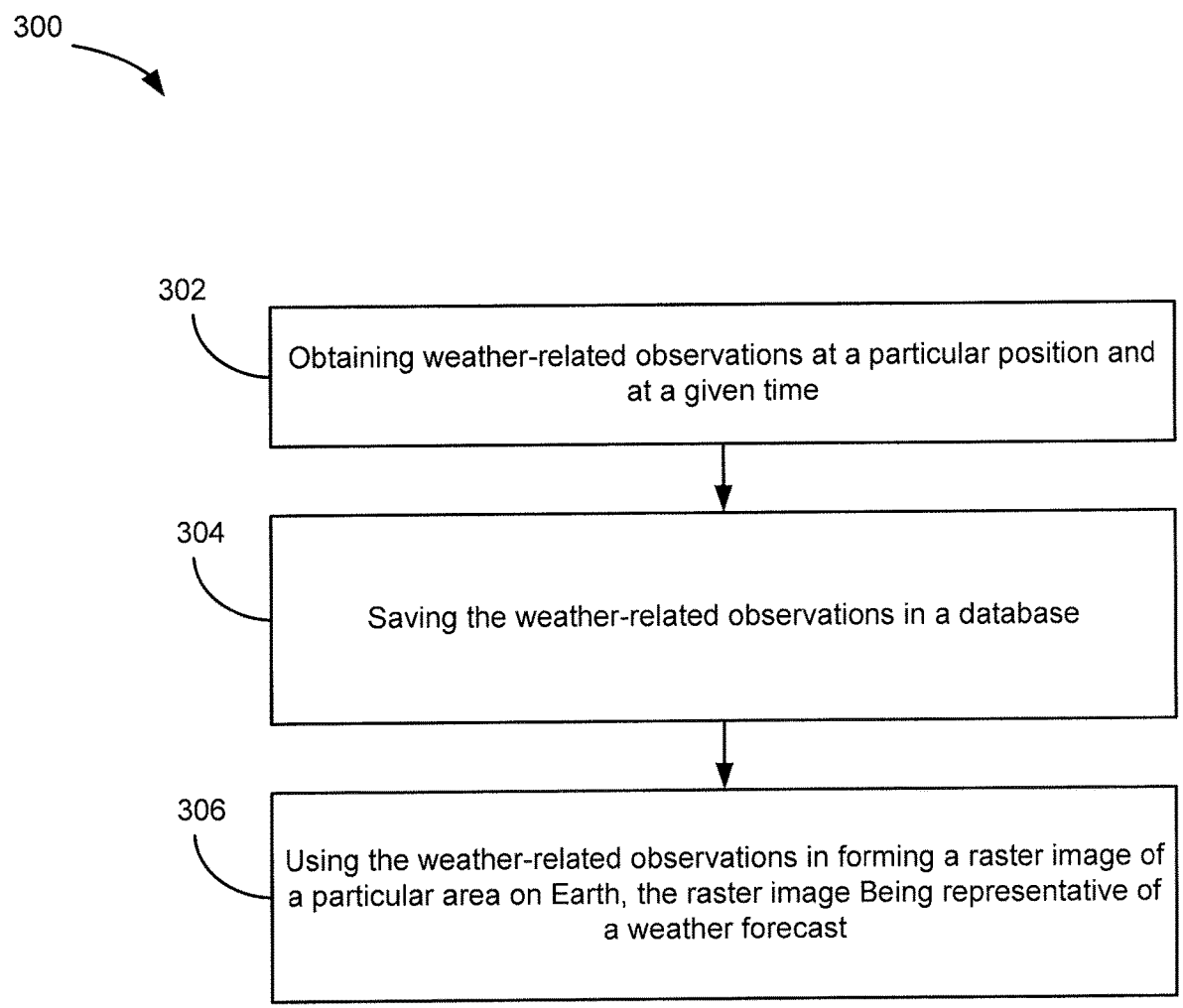
FIG. 2 shows an example of a flow chart of a method for crowd-sourcing weather observations for producing weather forecasts from the observations according to an embodiment.

Now turning to FIG. 2, there is shown a flow chart of a method 300 for crowd-sourcing weather observations for producing weather forecasts from the observations according to an embodiment.

The method 300 comprises:
obtaining weather-related observations at a particular position and at a given time (e.g., step 302);
saving the weather-related observations in a database (e.g., step 304); and
using the weather-related observations in forming a gridded image of a particular area on Earth, the gridded image comprising pixels wherein each pixel has a value which corresponds to a weather value which in turn corresponds to a weather forecast (e.g., step 306).

According to another embodiment of method 300, the step of obtaining the weather-related observations is automated or made by observers.

According to another embodiment, a mechanism is provided to deal with overlapping observation regions. For example, an observation is reported to a database. The observation may be tagged with a certain location and time such that when a second observation in the same location is later reported, it can be associated with the first reported observation. If the second observation is made at a time that is only within a short time period from the time at which the first observation is made, the second observation may be disregarded as a redundant report.

According to another embodiment, a mechanism is provided to rate the trustworthiness and reliability of weather observations. For example, if a report includes information that is inconsistent with the pre-stored weather data (e.g., a user reports snow in a certain location at certain time, but other objective weather data such as temperature, pressure, etc., indicate that snow is impossible in that certain location and time), then the user is given a reduced trust rating. The pre-stored weather data may include only the data obtained from objective weather sources and not data individually reported from users. The trust rating may be provided on a scale, and any reports from a source with a trust rating below a threshold may be disregarded in entirety.

According to another embodiment, the mosaic may be used in a weather nowcasting system.

Forecasting Hail Based on Points Observations

Briefly stated, the present embodiments describe a system and/or method that forecasts hail using an observation of the hail, a displacement field (e.g., flow field) and possibly weather radar data. The position and time of a hail event (e.g., observation) is transmitted to a computer. The computer attempts to determine if the weather radar signature is consistent with the hail observation. If it is, a region (e.g., hail area) is created by using radar signature, or not, and hail is forecasted into the future by analyzing motion of precipitation captured from radar and displacing hail area along the motion. If no radar correlation exists, a region (e.g., hail area) is created without radar. In either case, hail region can be modified as a function of time or distance from the original hail observation. A confidence score may also be generated as a function of time or distance from the original hail observation or any other parameter.

Figure 3:
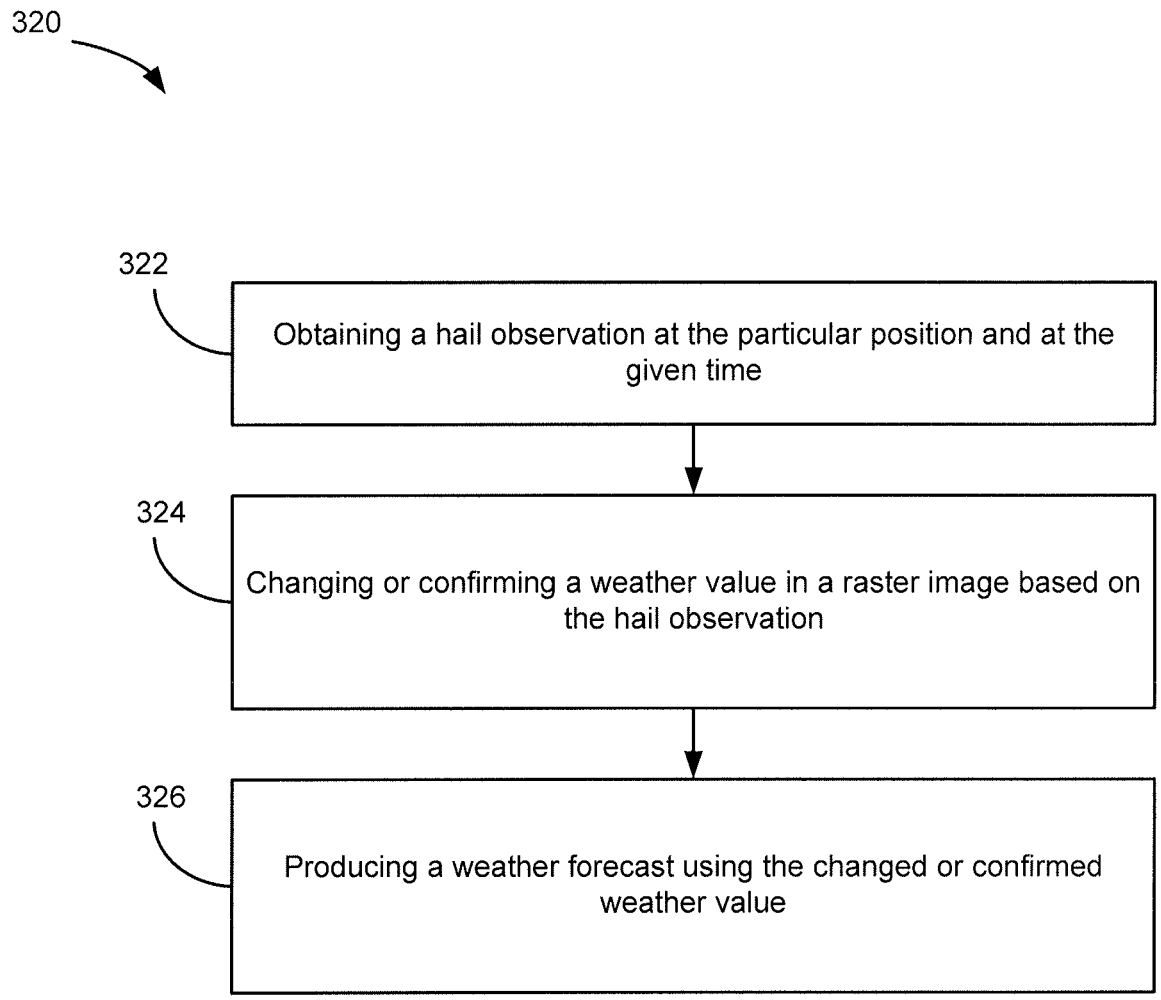
FIG. 3 shows an example of a flow chart of a method for forecasting hail based on point observations and weather radar data according to an embodiment.

Now turning to FIG. 3, there is shown a flow chart of a method 320 for forecasting hail based on point observations and weather radar data according to an embodiment.

It should be noted here that hail is but one example of a weather-related event. It should be understood that the embodiments described herein according to FIG. 3 and other figures also apply to other types of weather-related events defined herein or known to those skilled in the art.

The method 320 comprises:
- obtaining a hail observation at the particular position and at the given time (e.g., step 322);
- changing or confirming a weather value in a gridded image based on the hail observation (e.g., step 324); and
- producing a weather forecast using the changed or confirmed weather value (e.g., step 326).

According to another embodiment, method 320 further comprises creating or confirming a hail area in a region of the gridded image using the weather value.

According to another embodiment, method 320 further comprises obtaining a displacement field of weather values in or around the region of the gridded image, analyzing the motion of the hail area and refining the weather forecast based on the motion of the hail area.

According to another embodiment, method 320 further comprises determining whether a weather radar signature in the gridded image at the particular position at the given time corresponds to a hail observation, and based on this determination, the weather value may be changed and/or a confidence score of the weather value may be calculated.

Using Contributions from Observers in Weather Forecast

Briefly stated, the present embodiments describe a system and method for reporting to a user who has made a contribution to the calculation of a forecast how many other people have benefited from his contribution.

A user makes an observation (observer) by indicating the position and time of a weather event that is transmitted to a computer making a forecast. The forecasting computer uses the observers' information to calculate forecasts for a period in the future.

Each request by a user to obtain a forecast is analyzed to generate a list of observers who have contributed to the users' forecast. Each observer is then made aware of the number of people (plus any other user characteristics) that have benefited from his observation.

A leaderboard may be constructed from this information. Observers may be compensated with awards, or status gains or badges based on the number of users impacted.

Figure 4:
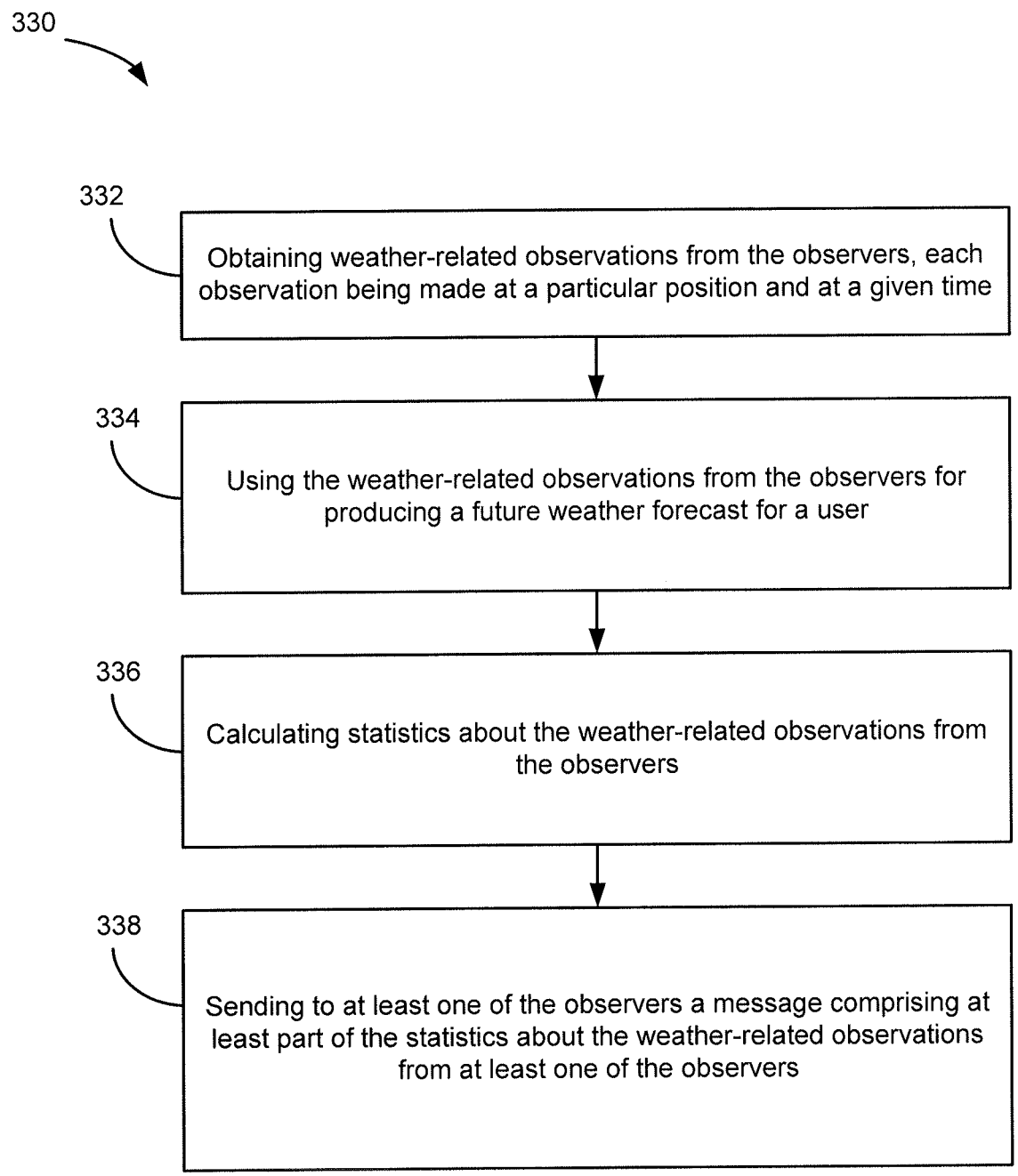
FIG. 4 shows an example of a flow chart of a method for using contributions from observers in a weather forecast according to an embodiment.

Now turning to FIG. 4, there is shown a flow chart of a method 330 for using contributions from observers in a weather forecast according to an embodiment.

The method 330 comprises:
- obtaining weather-related observations from the observers, each observation being made at a particular position and at a given time (e.g., step 332);
- using the weather-related observations from the observers for producing a future weather forecast for a user (e.g., step 334);
- calculating statistics about the weather-related observations from the observers (e.g., step 336); and
- sending to at least one of the observers a message comprising at least part of the statistics about the weather-related observations from at least one of the observers (e.g., step 338).

According to another embodiment, method 330 further comprises saving the weather-related observations in a database.

According to another embodiment of method 330, the step of calculating statistics comprises generating, from the weather-related observations, a selection of the observers who have contributed to the future weather forecast for the user and the users who have benefited from the weather forecast.

According to another embodiment of method 330, the step of calculating statistics comprises generating, from the weather-related observations and for one or more of the observers, a list of users for whom the observations of the one or more of the observers were used in producing the future weather forecast.

According to another embodiment of method 330, the step of calculating statistics comprises generating, from the weather-related observations and for each of the observers, a reliability of observations made from respective observers.

According to another embodiment of method 330, the step of calculating statistics comprises generating, from the weather-related observations and from at least one of the number of observations and the reliability of observations, an ordered list of the observers.

According to another embodiment, method 330 further comprises providing an advantage to at least one of the observers based on the ordered list.

Now turning to FIGS. 5A to 5D, there are shown screen-shots of an application used for presenting weather forecast, and for obtaining point observations from observers according to an embodiment.

Figure 5A:

More specifically, FIG. 5A is a screen-shot of a nowcasting application. The screen-shot shows an "eye" icon in the top right-hand corner. The "eye" icon is an indication to the user that an observation may be input into the system. Selecting the "eye" icon brings up the point observations pages (see FIGS. 5B and 5C).

Figure 5B:
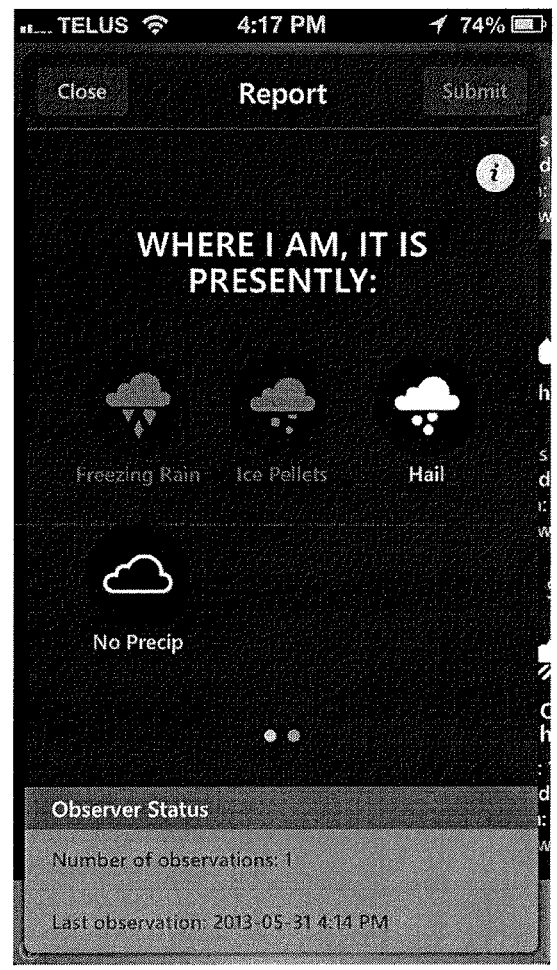

FIGS. 5B and 5C are screen-shots of pages of the nowcasting application which provides choices to the observer for making a point observation.

FIG. 5D is a screen-shot showing that "Sunny" is selected. The "Submit" button is now activated since a selection of a point observation has been made. Once the "Submit" button is selected, a confirmation page may be provided to confirm the observer's selection. Once confirmed, the point observation is sent to the nowcaster.

Figure 6:
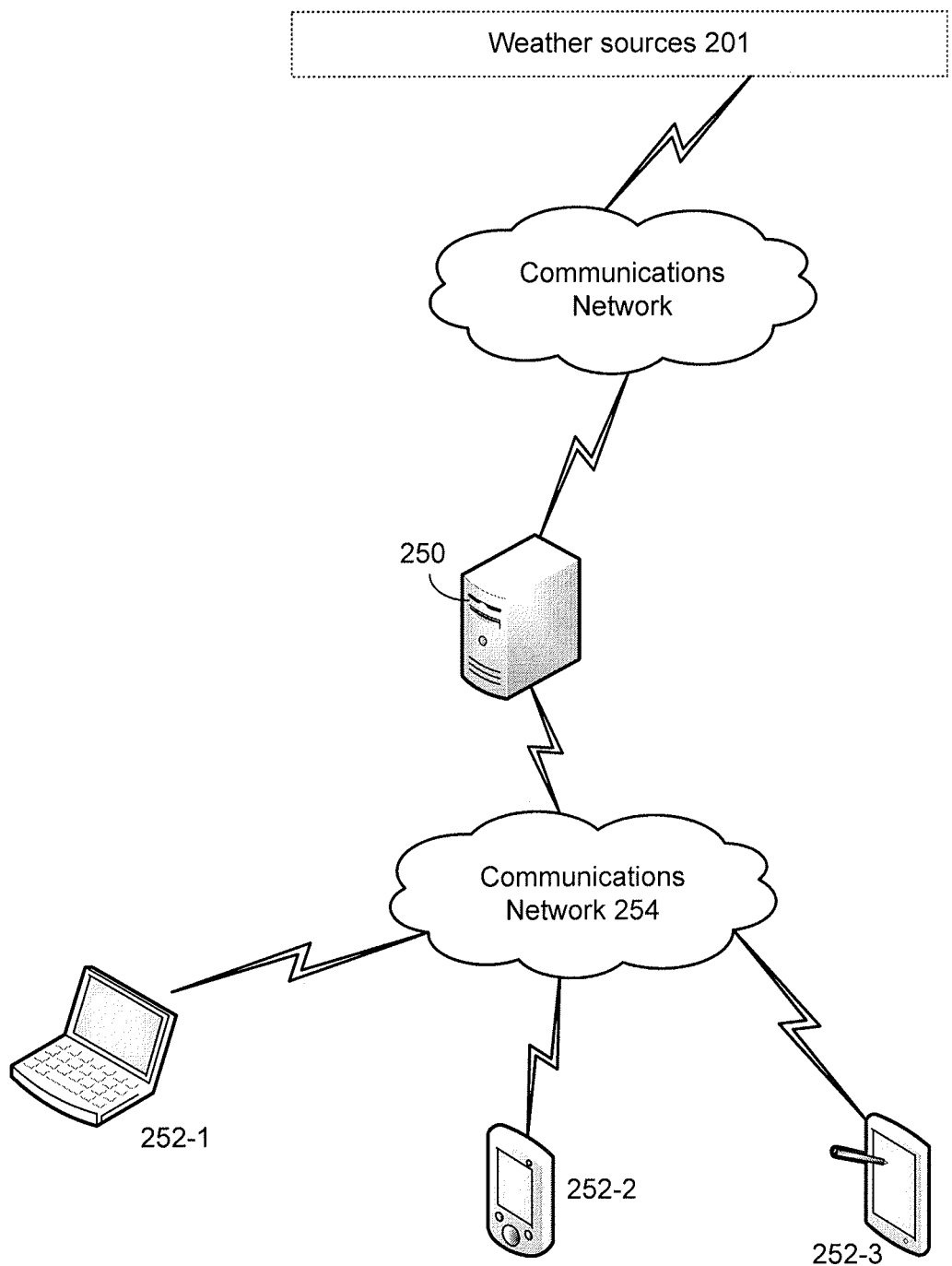
FIG. 6 shows an example of a network environment in which the embodiments may be practiced.

FIG. 6 is an example of a network environment in which the embodiments may be practiced. The system 200 (e.g., "nowcaster") may be implemented on a server/computer 250 which is accessible by a plurality of client computers 252 over a telecommunications network 254. The client computers may include but are not limited to: laptops, desktops, portable computing devices, tablets and the like. Using a client computer 252, each user may specify the time interval for which they want to receive the nowcasts and the location for which the nowcasts are needed. For example, the user may enter the ZIP/postal code, address, location on a map or the latitude and longitude of the location for which the nowcasts are needed, along with the time interval over which the nowcasts are needed. The time interval may extend between one minute and several hours.

Upon receiving the location information and time information, the server 250 may receive the available weather values for the specified location, and output the different PTypeRates discussed above which represent the nowcasts for the specific location over the specified period. Accuracy of the nowcasts may also depend on the number of weather sources available for a certain area. For example, an area that is highly populated may include more weather radars and more media attention (and thus more satellite coverage or forecasts) than a remote area in a forest. The nowcaster may also output other types of weather information such as weather events.

The PTypeRates produced by the server 250 may then be sent to the client computer 252 for display to the user. In an embodiment, it is possible to display the PTypeRates in a series, one after the other, or display those having a higher percentage.

Hardware and Operating Environment

Figure 7:
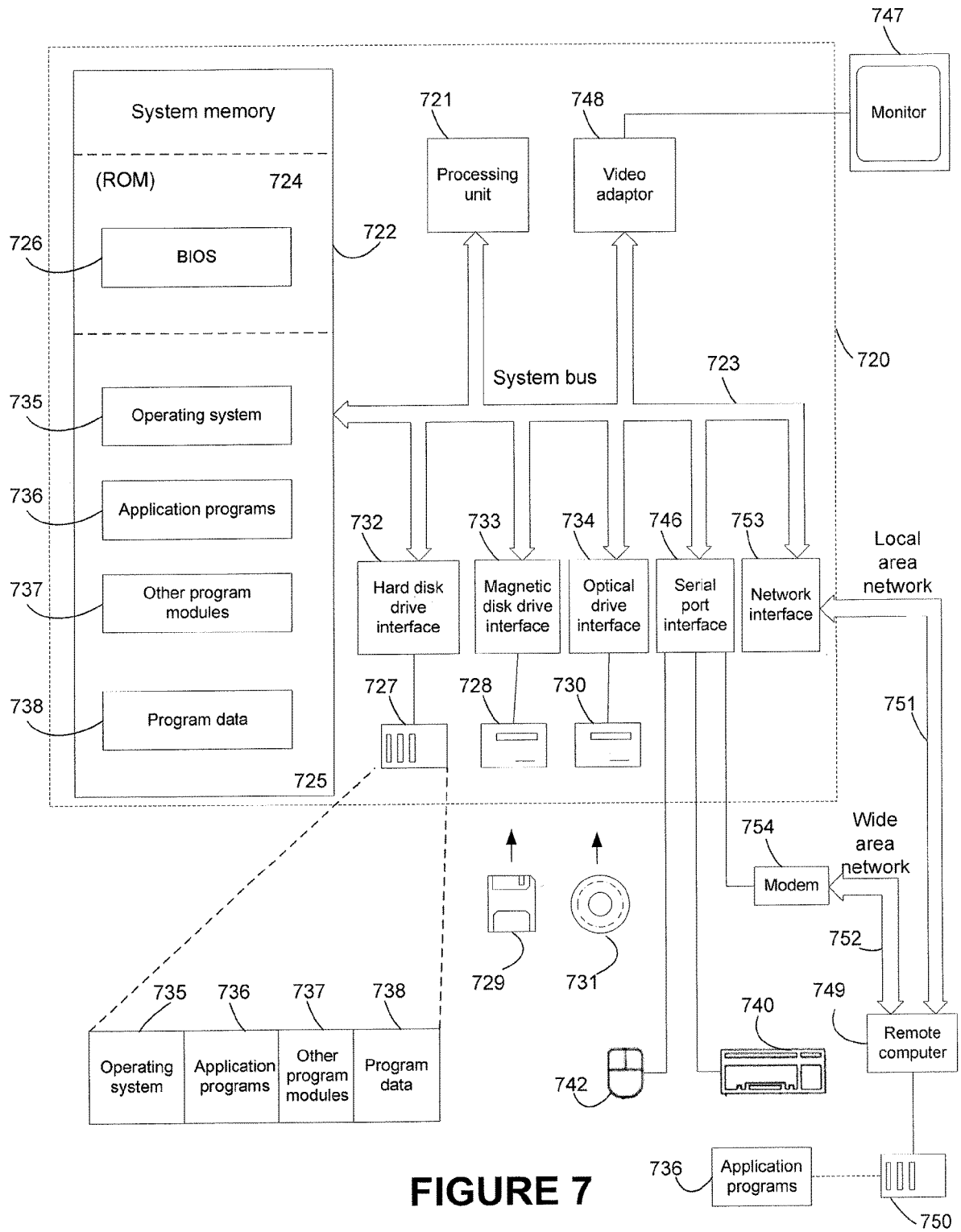
FIG. 7 illustrates an exemplary diagram of a suitable computing operating environment in which embodiments of the claimed subject matter may be practiced.

FIG. 7 illustrates an exemplary diagram of a suitable computing operating environment in which embodiments of the claimed subject matter may be practiced. The following description is associated with FIG. 5 and is intended to provide a brief, general description of suitable computer hardware and a suitable computing environment in conjunction with which the embodiments may be implemented. Not all the components are required to practice the embodiments, and variations in the arrangement and type of the components may be made without departing from the spirit or scope of the embodiments.

Although not required, the embodiments are described in the general context of computer-executable instructions, such as program modules, being executed by a computer, such as a personal computer, a handheld or palm-size computer, smartphone, or an embedded system such as a computer in a consumer device or specialized industrial controller. Generally, program modules include routines, programs, objects, components, data structures, etc., that perform particular tasks or implement particular abstract data types.

Moreover, those skilled in the art will appreciate that the embodiments may be practiced with other computer system configurations, including handheld devices, multiprocessor systems, microprocessor-based or programmable consumer electronics, network PCS, minicomputers, mainframe computers, cellular telephones, smartphones, display pagers, radio frequency (RF) devices, infrared (IR) devices, Personal Digital Assistants (PDAs), laptop computers, wearable computers, tablet computers, a device of the iPod or iPad family of devices, integrated devices combining one or more of the preceding devices, or any other computing device capable of performing the methods and systems described herein. The embodiments may also be practiced in distributed computing environments where tasks are performed by remote processing devices that are linked through a communications network. In a distributed computing environment, program modules may be located in both local and remote memory storage devices.

The exemplary hardware and operating environment of FIG. 5 includes a general-purpose computing device in the form of a computer 720, including a processing unit 721, a system memory 722, and a system bus 723 that operatively couples various system components, including the system memory, to the processing unit 721. There may be only one or there may be more than one processing unit 721, such that the processor of computer 720 comprises a single central-processing unit (CPU), or a plurality of processing units, commonly referred to as a parallel processing environment. The computer 720 may be a conventional computer, a distributed computer, or any other type of computer; the embodiments are not so limited.

The system bus 723 may be any of several types of bus structures including a memory bus or memory controller, a peripheral bus, and a local bus using any of a variety of bus architectures. The system memory may also be referred to as simply the "memory," and includes read-only memory (ROM) 724 and random access memory (RAM) 725. A basic input/output system (BIOS) 726, containing the basic routines that help to transfer information between elements within the computer 720, such as during start-up, is stored in ROM 724. In one embodiment of the claimed subject matter, the computer 720 further includes a hard disk drive 727 for reading from and writing to a hard disk, not shown, a magnetic disk drive 728 for reading from or writing to a removable magnetic disk 729, and an optical disk drive 730 for reading from or writing to a removable optical disk 731 such as a CD ROM or other optical media. In alternative embodiments of the claimed subject matter, the functionality provided by the hard disk drive 727, magnetic disk 729 and optical disk drive 730 is emulated using volatile or non-volatile RAM in order to conserve power and reduce the size of the system. In these alternative embodiments, the RAM may be fixed in the computer system, or it may be a removable RAM device, such as a compact flash memory card.

In an embodiment of the claimed subject matter, the hard disk drive 727, magnetic disk drive 728 and optical disk drive 730 are connected to the system bus 723 by a hard disk drive interface 732, a magnetic disk drive interface 733 and an optical disk drive interface 734, respectively. The drives and their associated computer-readable media provide non-volatile storage of computer-readable instructions, data structures, program modules and other data for the computer 720. It should be appreciated by those skilled in the art that any type of computer-readable media which can store data that is accessible by a computer, such as magnetic cassettes, flash memory cards, digital video disks, Bernoulli cartridges, random access memories (RAMs), read-only memories (ROMs) and the like, may be used in the exemplary operating environment.

A number of program modules may be stored on the hard disk, magnetic disk 729, optical disk 731, ROM 724 or RAM 725, including an operating system 735, one or more application programs 736, other program modules 737 and program data 738. A user may enter commands and information into the personal computer 720 through input devices such as a keyboard 740 and pointing device 742. Other input devices (not shown) may include a microphone, joystick, game pad, satellite dish, scanner, touch-sensitive pad or the like. These and other input devices are often connected to the processing unit 721 through a serial port interface 746 that is coupled to the system bus, but may be connected by other interfaces, such as a parallel port, game port or a universal serial bus (USB). In addition, input to the system may be provided by a microphone to receive audio input.

A monitor 747 or other type of display device is also connected to the system bus 723 via an interface, such as a video adapter 748. In one embodiment of the claimed subject matter, the monitor comprises a liquid crystal display (LCD). In addition to the monitor, computers typically include other peripheral output devices (not shown), such as speakers and printers. The monitor may include a touch-sensitive surface which allows the user to interface with the computer by pressing on or touching the surface.

The computer 720 may operate in a networked environment using logical connections to one or more remote computers, such as a remote computer 749. These logical connections are achieved by a communication device coupled to or a part of the computer 720; the embodiment is not limited to a particular type of communications device. The remote computer 749 may be another computer, a server, a router, a network PC, a client, a peer device or other common network node, and typically includes many or all of the elements described above relative to the computer 720, although only a memory storage device 750 has been illustrated in FIG. 6. The logical connections depicted in FIG. 6 include a local-area network (LAN) 751 and a wide-area network (WAN) 752. Such networking environments are commonplace in offices, enterprise-wide computer networks, intranets and the Internet.

When used in a LAN-networking environment, the computer 720 is connected to the local network 751 through a network interface or adapter 753, which is one type of communications device. When used in a WAN-networking environment, the computer 720 typically includes a modem 754, a type of communications device or any other type of communications device for establishing communications over the wide area network 752, such as the Internet. The modem 754, which may be internal or external, is connected to the system bus 723 via the serial port interface 746. In a networked environment, program modules depicted relative to the personal computer 720, or portions thereof, may be stored in the remote memory storage device. It is appreciated that the network connections shown are exemplary and other means of and communications devices for establishing a communications link between the computers may be used.

The hardware and operating environment in conjunction with which embodiments of the claimed subject matter may be practiced has been described. The computer in conjunction with which embodiments of the claimed subject matter may be practiced may be a conventional computer, a handheld or palm-size computer, a computer in an embedded system, a distributed computer or any other type of computer; the claimed subject matter is not so limited. Such a computer typically includes one or more processing units as its processor, and a computer-readable medium such as a memory. The computer may also include a communications device such as a network adapter or a modem, so that it is able to communicatively couple other computers.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A computer-implemented method for reporting to a user who has made a contribution to a calculation of a forecast how many other people have benefited from the contribution, comprising:
   receiving, from a remote device, weather-related observation data associated with a first location and a first time, the weather-related observation data comprising data on a weather-related event associated with the first location and the first time;
   storing, in a database, the received weather-related observation data;
   generating, using control circuitry, a weather forecast associated with a second location and a second time based on the weather-related observation data;
   producing, using the control circuitry, a first statistic associated with the stored weather-related observation data, the first statistic indicating a number of users who have contributed to the weather forecast;
   outputting the first statistic and an image of the second location including the weather forecast to the remote device;
   producing, using the control circuitry, a second statistic associated with the stored weather-related observation data, the second statistic indicating a number of users who have benefited from the weather forecast;
   outputting the second statistic to the remote device.

2. The method of claim 1, wherein the weather-related event is observed by a user operating the remote device, and the user causes the remote device to transmit the weather-related observation data.

3. The method of claim 1, wherein the remote device automatically transmits weather-related observation data upon detecting an observation of a weather-related event.

4. The method of claim 1, further comprising:
   comparing the weather-related observation data with pre-stored weather data; and
   determining, based on the comparison, a weight associated with the weather-related observation data.

5. The method of claim 1, wherein producing the statistic comprises generating a list of users who contributed to the weather-related observation data.

6. The method of claim 1, wherein the image further includes a user characteristic of users who contributed to the weather-related observation data.

7. The method of claim 1, further comprising generating a leaderboard of users who contributed to the weather-related observation data.

8. The method of claim 1, further comprising generating for display a gridded image comprising weather-related observation data.

9. The method of claim 1, wherein the second time is a future time.

10. The method of claim 1, further comprising generating a reliability metric of the weather-related observation data.

11. A system for reporting to a user who has made a contribution to a calculation of a forecast how many other people have benefited from the contribution, comprising:
   a database configured for storing received weather-related observation data; and
   control circuitry configured to:
      receive, from a remote device, the weather-related observation data associated with a first location and a first time, the weather-related observation data comprising data on a weather-related event associated with the first location and the first time;
      generate a weather forecast associated with a second location and a second time based on the weather-related observation data;
      produce a first statistic associated with the stored weather-related observation data, the first statistic indicating a number of users who have contributed to the weather forecast;
      output the first statistic and an image of the second location including the weather forecast to the remote device
      produce, using the control circuitry, a second statistic associated with the stored weather-related observation data, the second statistic indicating a number of users who have benefited from the weather forecast; and
      output the second statistic to the remote device.

12. The system of claim 11, wherein the weather-related event is observed by a user operating the remote device, and the user causes the remote device to transmit the weather-related observation data.

13. The system of claim 11, wherein the remote device automatically transmits weather-related observation data upon detecting an observation of a weather-related event.

14. The system of claim 11, wherein the control circuitry is further configured to:
   compare the weather-related observation data with pre-stored weather data; and determine, based on the comparison, a weight associated with the weather-related observation data.

15. The system of claim 11, wherein producing the statistic comprises generating a list of users who contributed to the weather-related observation data.

16. The system of claim 11, wherein the image further includes a user characteristic of users who contributed to the weather-related observation data.

17. The system of claim 11, wherein the control circuitry is further configured to generate a leaderboard of users who contributed to the weather-related observation data.

18. The system of claim 11, wherein the control circuitry is further configured to generate for display a gridded image comprising weather-related observation data.

19. The system of claim 11, wherein the second time is a future time.

20. The system of claim 11, wherein the control circuitry is further configured to generate a reliability metric of the weather-related observation data.

21. A computer-implemented method for reporting to a user who has made a contribution to a calculation of a forecast how many other people have benefited from the contribution, comprising:

receiving, from a remote device, weather-related observation data associated with a first location and a first time, the weather-related observation data comprising data on a weather-related event associated with the first location and the first time;

storing, in a database, the received weather-related observation data;

generating, using control circuitry, a weather forecast associated with a second location and a second time based on the weather-related observation data;

producing, using the control circuitry, a first statistic associated with the stored weather-related observation data, the first statistic indicating a first number of users who have contributed to the weather forecast and a second number of users who have used the weather forecast;

outputting the first statistic and an image of the second location including the weather forecast to the remote device;

producing, using the control circuitry, a second statistic associated with the stored weather-related observation data, the second statistic indicating a number of users who have benefited from the weather forecast; and outputting the second statistic to the remote device.

\* \* \* \* \*